(12) United States Patent
Duran et al.

(10) Patent No.: US 6,440,001 B1
(45) Date of Patent: Aug. 27, 2002

(54) METHOD FOR FORMING A THREADED PIN AND NUT COMBINATION

(75) Inventors: John A. Duran, Glendora; Edward Avetisian, Burbank; Todd Diamond, Santa Paula, all of CA (US)

(73) Assignee: Avibank Mfg., Inc., North Hollywood, CA (US)

( * ) Notice: Subject to any disclaimer, the term of this patent is extended or adjusted under 35 U.S.C. 154(b) by 0 days.

(21) Appl. No.: 09/876,357

(22) Filed: Jun. 7, 2001

Related U.S. Application Data

(62) Division of application No. 09/552,474, filed on Apr. 18, 2000, now Pat. No. 6,290,445.

(51) Int. Cl.[7] .............................................. B21H 3/02
(52) U.S. Cl. ................................................. 470/10
(58) Field of Search ........................ 470/8–10; 411/411, 411/423, 395, 399, 366.1, 283, 361, 427, 435

(56) References Cited

U.S. PATENT DOCUMENTS

| 658,086 | A | * | 9/1900 | Higbee |
| 3,433,117 | A | * | 3/1969 | Gowen |
| 4,040,327 | A | * | 8/1977 | Otaki |
| 4,326,825 | A | * | 4/1982 | Volkmannn |
| 4,778,318 | A | * | 10/1988 | Jeal |
| 4,786,226 | A | * | 11/1988 | Jende |
| 6,036,419 | A | * | 3/2000 | Lanham |
| 6,290,445 | B1 | * | 9/2001 | Duran |

* cited by examiner

Primary Examiner—Flemming Saether
(74) Attorney, Agent, or Firm—Oppenheimer Wolff & Donnelly LLP

(57) ABSTRACT

Apparatus and method for forming a pin and nut fastener assembly for temporarily or permanently securing two panels having conventional drilled generally aligned holes into which the assembly is inserted. Weight of the pin and nut is reduced while retaining predetermined industry established strength requirements. The thread section of the pin is reduced along with the mating thread of the nut. The pin may be cold-worked in critical areas.

4 Claims, 8 Drawing Sheets

METHOD FOR FORMING A THREADED PIN AND NUT COMBINATION

This is a divisional of application Ser. No. 09/552,474 filed Apr. 18, 2000 now U.S. Pat. No. 6,290,445.

BACKGROUND OF THE INVENTION

1. Field of the Invention

The invention relates to fastener assemblies, and more particularly, to non-removable structural fastener assemblies for aircraft panels or the like.

2. Description of Pertinent Art

Fasteners are used in a variety of applications, wherein surfaces being connected together impose unique stringent requirements for which the fastener must particularly adapt.

The applications, in which rivets or structural fasteners are used in the construction of aircraft, impose some of the most stringent requirements. In particular, the fasteners must secure different members of the aircraft, but resist losing their clamping power under the forces and vibrations imposed upon them by the harsh environment in which they are used.

In assembling panels to the aircraft structure, alignment problems may occur where the panels are to be affixed to the aircraft body. Over the years, aircraft manufacturers have sought various solutions to this problem, such as line hole drilling the panels and body substructure. Due to the size of the panels and the quantity of the holes, the holes on the panels and substructure still get misaligned and installation of traditional fasteners offer many challenges. Therefore, there is a need of a fastener that will have the ability to align the holes drilled during installation. This will reduce the effort required to install the fasteners in the aircraft panels.

In most aircraft fastening applications, the fasteners are made substantially stronger than the strength of the joint. In most cases the joint fails (e.g. hole elongation, edge tear-out, etc.) while the fastener is still in tact. Therefore, there is a need for a fastener that better complements the strength of the joint and offers considerable weight savings sought by the aircraft industry.

It is important to achieve this goal without compromising the standards established by the aircraft industry. Such standards are set forth by industry recognized professional organizations (e.g. National Aerospace Standard (NAS)) or are established by industry leaders as Boeing Airplane Co. or Lockheed Martin

SUMMARY OF THE INVENTION

It is an object of this invention to provide apparatus for permanently attaching two aircraft panels together.

It is a further object of this invention to carry out the foregoing object using parts of a lesser weight than used in the past resulting in a considerable reduction in weight of the overall aircraft. More specifically, for standard structural fastener applications, this invention uses a thread diameter that is smaller then thread diameters used in equivalent diameter fasteners. For example, a ¼" diameter pin generally uses a ¼" diameter thread; but for this invention a ¼" bolt shall incorporate a 0.216" diameter thread with a modified minor diameter and root radius.

It is also the object of this invention to provide a pin with the capability to align the holes on the aircraft panels with the holes on the aircraft structure. This feature allows easier installation of the fastener as in most cases the holes get misaligned during the fastening installation process.

It is still another object of this invention to provide a method for carrying out the foregoing objects.

These and other objects are preferably accomplished by providing a pin having a head at one end, a threaded shaft portion at the other end. A transition section interconnecting the head and the shaft portion, the thread having special characteristics that is created by using a standard thread with outer major diameter D and a minor inner diameter d to provide a thread in the outer thread major diameter $D_1$ and an inner thread minor diameter $d_1$. The distance h between the same being between about 55% to 65% of the distance between the original major diameter D and the original minor diameter d. A nut having a main body portion with a threaded throughbore may be threadably mounted on the threaded shaft portion of the pin, the thread of the nut being adapted to mate with the thread of the pin [Annular ridges separated by grooves may provide the locking elements.] The aforementioned thus creates a fastener with a normal body diameter and modified smaller diameter thread which incorporates features that allows this combination of pin and nut to meet the structural requirements of established standards.

DESCRIPTION OF THE PREFERRED EMBODIMENT

Figure 1:
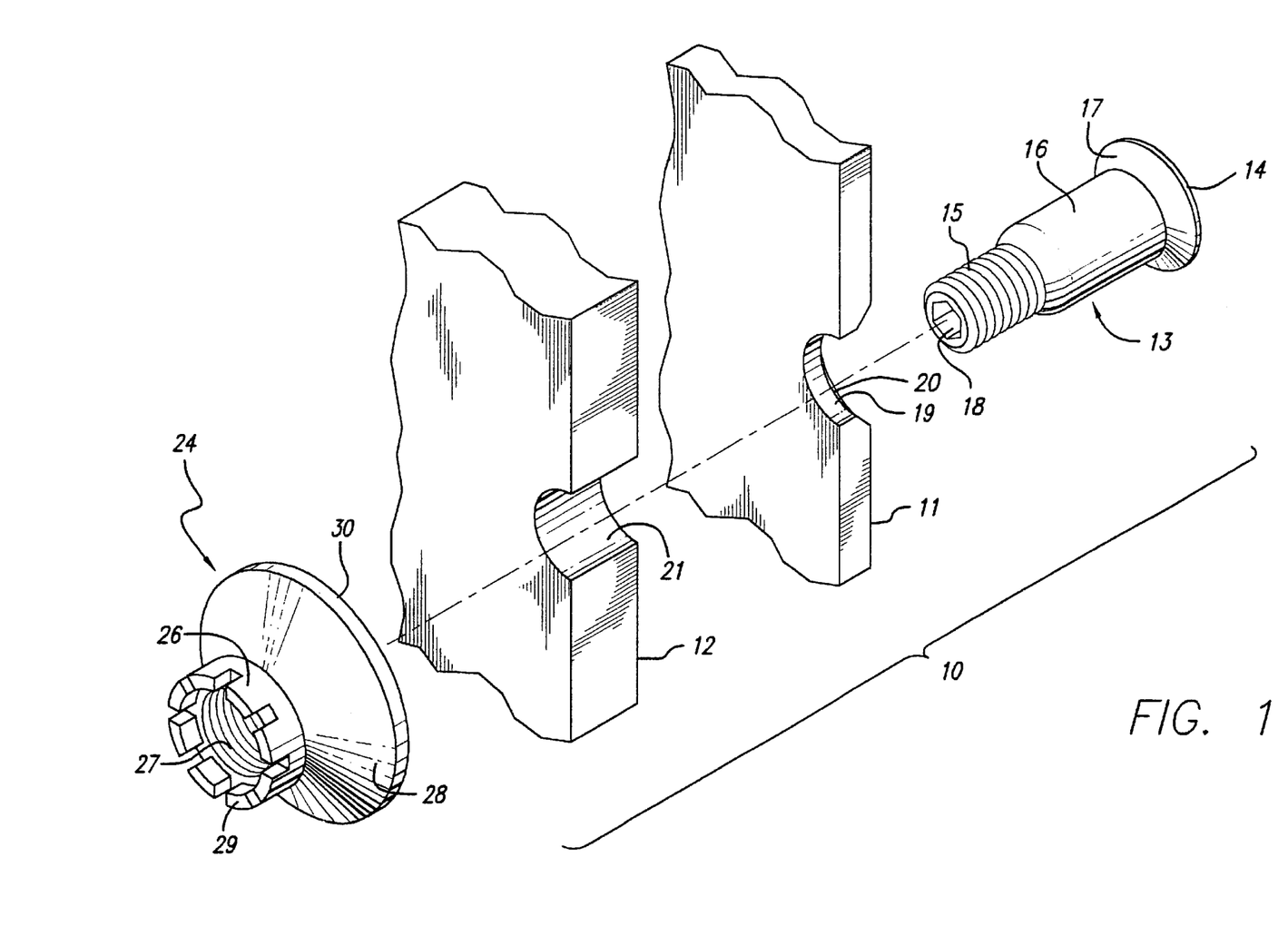
FIG. 1 is an exploded view of a fastener assembly in accordance with the invention showing a pair of panels in which the fastener is to be installed.
Figure 8:
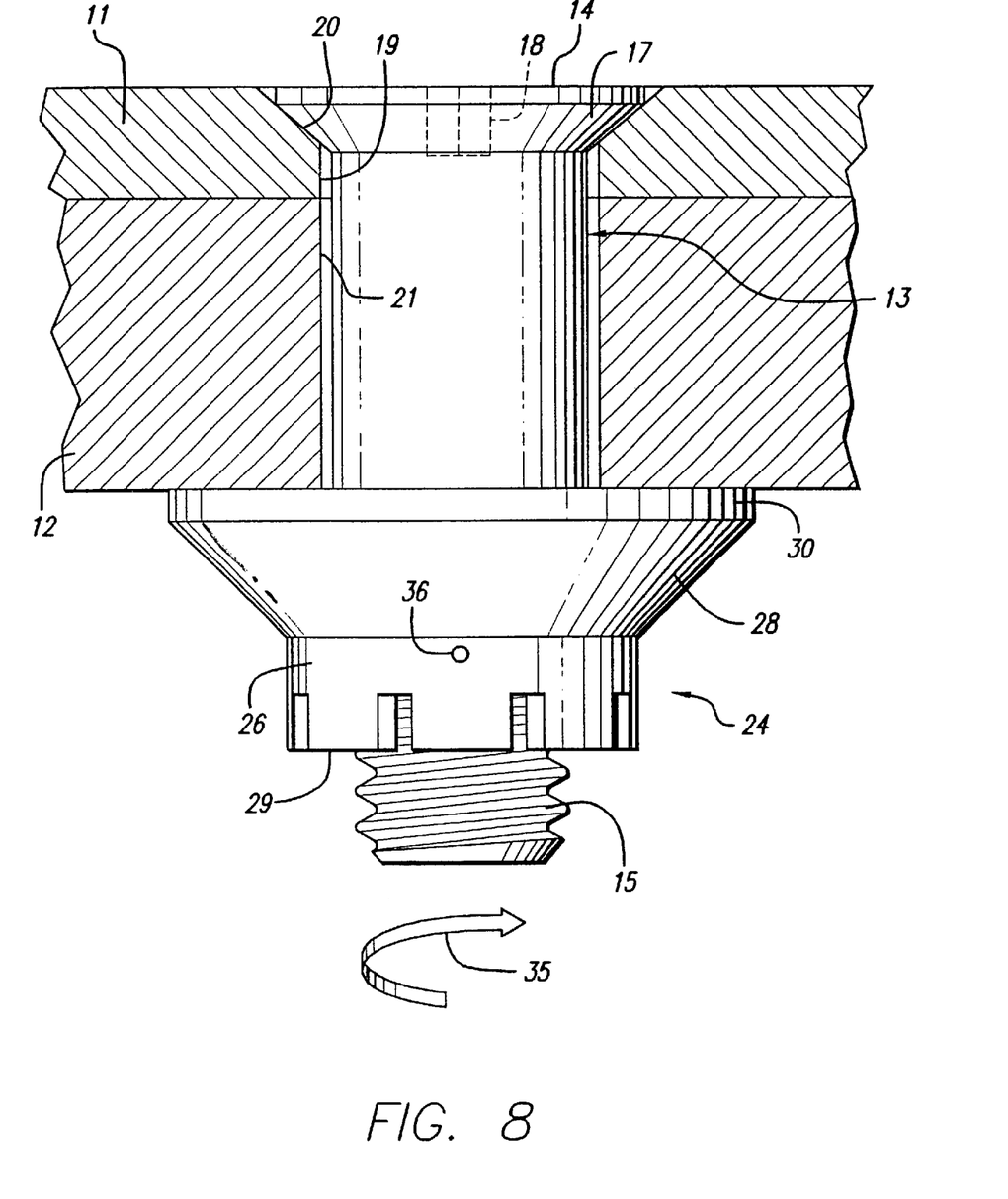
FIG. 8 is an elevation view illustrating the final steps in tightening of the nut of the assembled fastener assembly of FIG. 1.

Referring now to FIG. 1 of the application, a fastener assembly 10 is shown adapted to permanently secure together a pair of mating panels 11, 12 (see also FIG. 8). Assembly 10 includes a pin 13 (FIG. 1) having a head 14 at one end and a threaded shaft portion 15 at the other end interconnected by an integral main body portion 16. Head 14 may be tapered on the underside 17 thereof. A hex drive socket 18 may be provided in the terminal end of threaded shaft portion 15 for reasons to be discussed.

Panel 11 is the main outer panel, which may be an aircraft outer skin or the like, and has a hole 19 therethrough countersunk at countersunk 20 (see FIG. 8). Panel 11 is adapted to abut against inside panel 12 which has a hole 21 (FIG. 1) therethrough. Hole 21 is generally aligned with hole 19 (but, as hereafter discussed, may be slightly misaligned).

Assembly 10 includes a nut 24 having a generally cylindrical main body portion 26 and an inner threaded throughbore 27. Nut 24 also has a circular outwardly flared skirt portion 28 terminating in a cylindrical portion 30' integral with and extending from main body portion 26. An external drive system for nut 24 may be provided in the form of a plurality of spaced protrusions 29 extending about the outer periphery of main body portion 26. These protrusions 29 are formed by cutting out rectangularly shaped areas or slots about the periphery of main body portion 26 extending away from the same as clearly seen in FIG. 8.

Pin 13 in FIG. 1 is formed from a pin blank 100 (FIG. 2) having a head 14 at one end, which may be enlarged, cylindrical shank portion 16, hex drive socket 18 and end section 101. A reducing transition section 102 is provided between shank portion 16 and end section 101. The transition section 102 interconnects the shank portion 16 and a neck section 103 leading to the end section 101. It includes a rounded shoulder 104 adjacent the shank portion 16, and an intersection 105 leading to neck section 103. The normal grain flow of blank 100 at head 14 is shown by flow lines 106. The normal grain flow at reducing transition section 102, shoulder 104, intersection 105 and neck section 103 is shown by flow lines 107.

Figure 3:
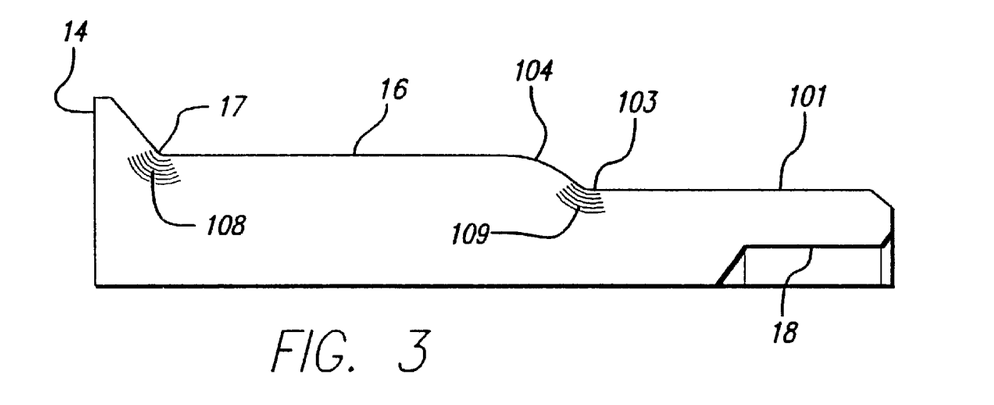
FIGS. 3 and 4 are views similar to the FIG. 2 illustrating steps in the formation of the pin of the fastener assembly of FIG. 1.

As seen in FIG. 3, the areas at the underside 17 of head 14 leading into shank portion 16 may be cold-worked as indicated by lines 108 as is well known in the prior art. The area at the intersection 105 between shoulder 104 and neck section 103 may also be cold-worked as indicated at lines 109 as is well known in the prior art.

Figure 2:
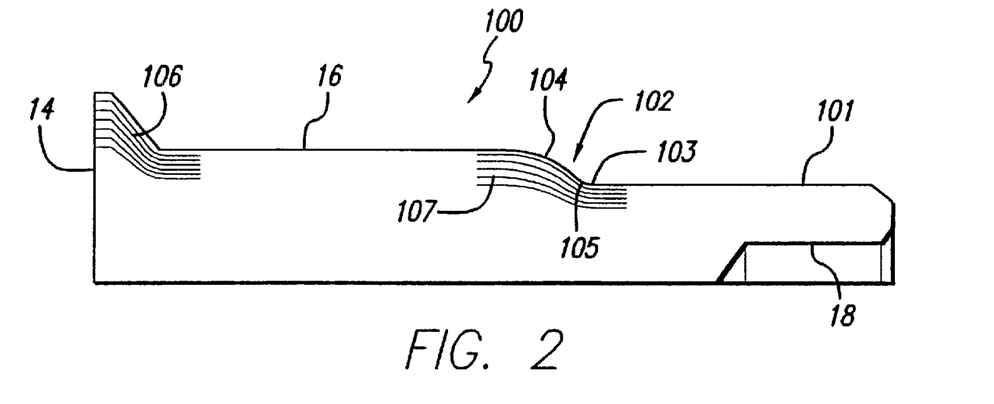
FIG. 2 is an elevation view of a pin blank for forming the pin of the fastener assembly of FIG. 1.

As seen in FIGS. 2 and 3, the outer diameter of shank portion 16 is substantially greater than the outer diameter of end section 101. For example, shank portion 16 may be about 0.250 inches in diameter and end section 101 may be about 0.216 inches in diameter. Thus, the outer thread diameter of threaded shaft portion 15 is about 14% smaller than the outer diameter of shank portion 16.

Figure 4:
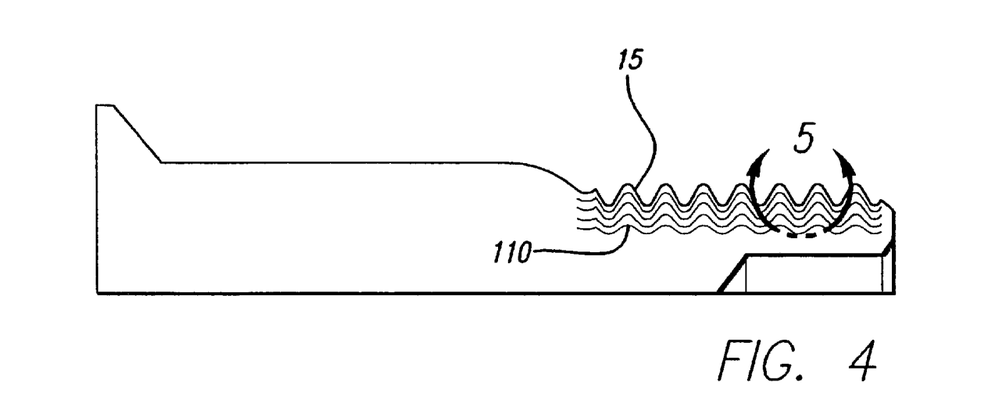

A modified helical thread (FIG. 4) is now formed in end section 101 forming the threaded shaft portion 15 shown in FIG. 4. The thread is formed in any suitable manner, such as by rolling, and the grain material flow along the thread is shown by grain flow lines 110.

Although head portion 14 is shown in FIGS. 1 to 4 as a countersink head, it may be of different configuration if desired,—e.g. protruding head, etc.

Figure 5:
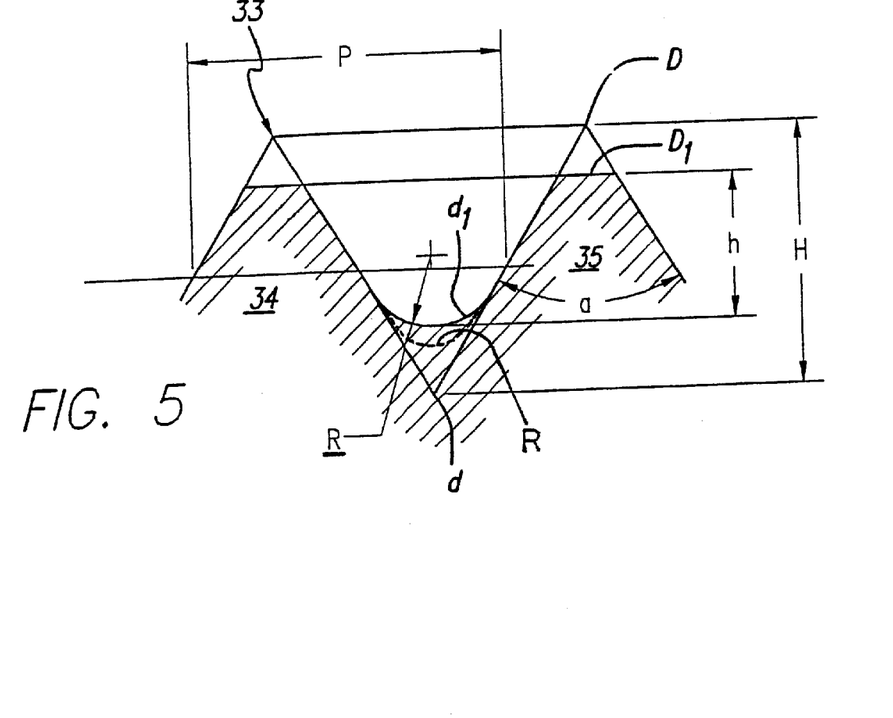
FIG. 5 is a schematic view of a portion of the threads of the pin of FIG. 1.
Figure 6:
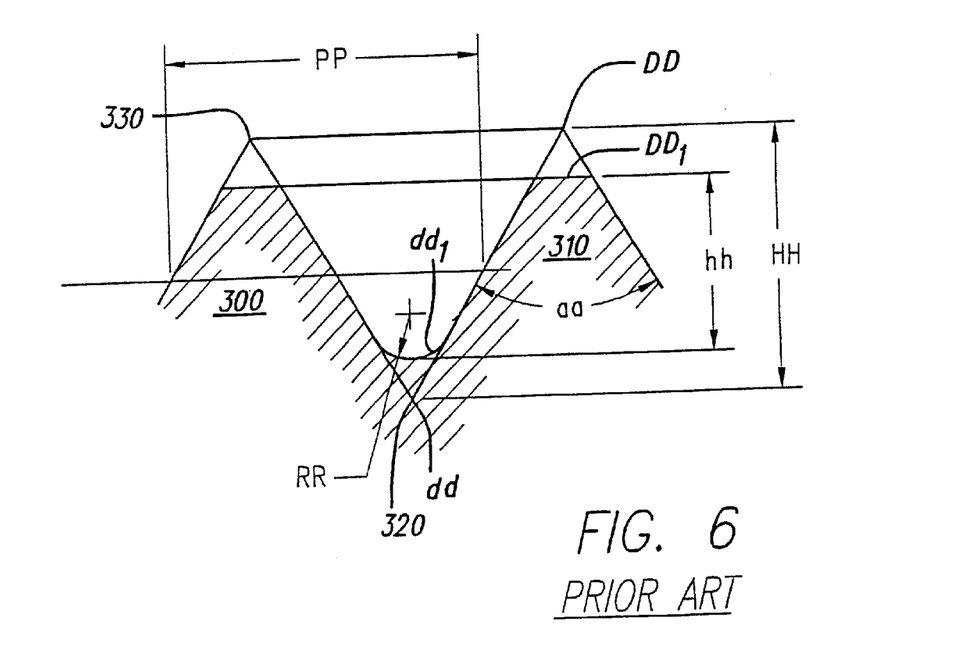
FIG. 6 is a prior art illustration similar to FIG. 5 of a conventional pin thread.

A detailed view of a portion of the thread of section 15 is shown in FIG. 5. A similar view of a conventional prior art thread is shown in FIG. 6. As seen in FIG. 6, thread portion 300 is separated from thread portion 310 by a groove 320 having a minor diameter dd. Each thread portion has an original apex 330, prior to formation of the trapezoidally shaped teeth, with a major diameter DD. The intersection between thread portions is curved forming the thread to a diameter dd, having a radius RR. The sides of thread portion 300,310 may form an angle aa of about 60° to the horizontal. The pitch or distance PP between the outside of thread portion 300 and the inside of adjacent thread portion 310 varies from pin to pin. A particular pin may have a pitch of about 20 to 32 threaded portions per inch. The distance hh in FIG. 6 between $DD_1$ and $dd_1$ is about 0.67 HH, HH being the distance between DD and dd.

As particularly contemplated in the present invention, and seen in FIG. 5, like dimensions being similar to like dimensions in FIG. 6, that is, the distance P in FIG. 5 corresponds to PP in FIG. 6; 33 in FIG. 5 corresponds to 330 in FIG. 6; D in FIG. 5 corresponds to DD in FIG. 6; $D_1$ in FIG. 5 corresponds to $DD_1$ in FIG. 6; $d_1$ in FIG. 5 corresponds to $dd_1$ in FIG. 6; 35 in FIG. 5 corresponds to 310 in FIG. 6; h in FIG. 5 corresponds to hh in FIG. 6; H in FIG. 5 corresponds to HH in FIG. 6; 34 in FIG. 5 corresponds to 300 in FIG. 6; a in FIG. 5 corresponds to aa in FIG. 6; d in FIG. 5 corresponds to dd in FIG. 6; and R in FIG. 5 corresponds to RR in FIG. 6, the distance P between similar thread portions 34, 35 is the same as the distance PP between thread portions 300, 310 in FIG. 6. The distance h between $D_1$ and $d_1$ is about 0.55H–65H. The radius R is about 1.25–1.50 of the radius of the standard pin of FIG. 6. Angle a in FIG. 5 is still 60° as is angle aa in FIG. 6.

Thus, the invention contemplates using a thread as in FIG. 5 that compares to a standard thread shown in FIG. 6 by keeping additional material at groove 32 to bring $d_1$ up to a value, as seen in FIG. 5, wherein the difference between $D_1$ (same as in FIG. 6) and $d_1$ in FIG. 5 is 0.55H–0.65H. Of course, a thread of differing dimensions would have a varying pitch (P) and root radius (R) but the proportional dimensions would be the same.

The foregoing results offer tremendous savings in weight reduction without compromising fatigue or tension requirements specified in established industry standards.

Figure 7:
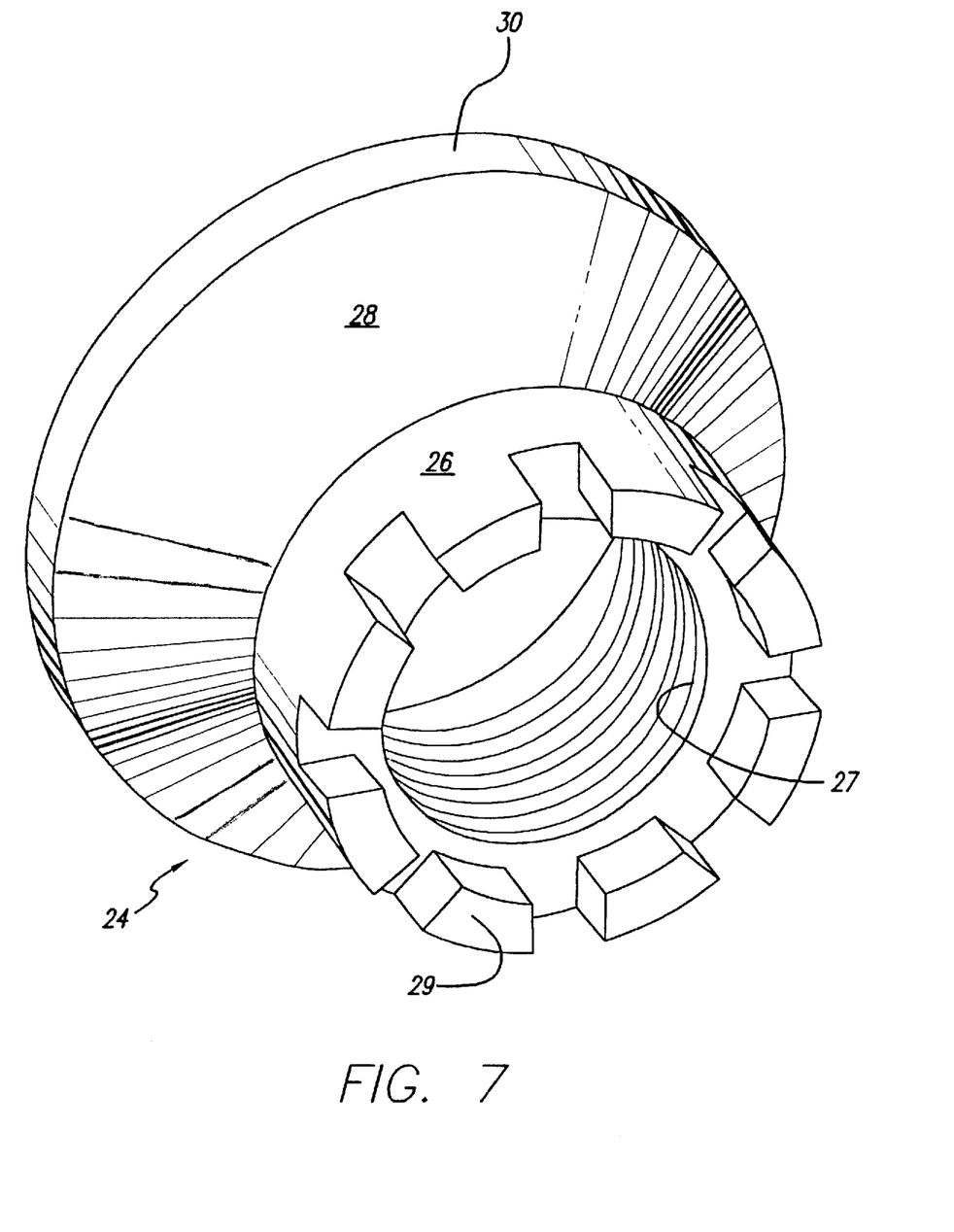
FIG. 7 is a perspective view of the nut alone of the assembly of FIG. 1.

The inner threads 27 of nut 24 (FIG. 7) mates with threaded shaft 15 and further discussion is deemed unnecessary. Such a thread 27 thus meets the same load requirements if used with a comparable strength nut. There is an additional savings due to the reduced weight of the thread of nut 24. In addition, the nut is of lightweight material that adds to the weight reduction.

The thread design of pin 13 and nut 24 is thus smaller than the usual ¼" outer diameter of conventional pins, but the unique and novel thread profile disclosed herein, although actually smaller than ¼" in outer diameter, satisfies the industry established requirements imposed on a ¼" diameter pins.

It has been found in tests that use of a pin 13 as disclosed herein results in approximately 8% weight savings over conventional pins. Use of a nut as disclosed herein results in approximately 4% weight savings over conventional nuts.

In operation, as seen in FIG. 8, pin 13 is inserted through aligned holes 19, 21 in panels 11, 12 until the tapered underside 17 of head 14 rests in countersunk 20 in panel 11. If holes 19, 21 are slightly misaligned, the rounded shoulder 104 assists in aligning the panels as the shaft 15 passes from one panel hole into the other. This shoulder 104 may be tapered to further assist in alignment. Nut 24 is now rotated in the direction of arrow 35 onto the threaded shaft 15 until it abuts against panel 12. This threading may be accomplished in any suitable manner, even manually. However, preferably a hex tool (not shown) is inserted into hex socket 18 of pin 13 holding pin 13 in position while another tool (not shown) locks onto protrusions 29 and rotates nut 24 in the direction of arrow 35. Rotation of nut 24 on threaded shaft 15 while holding pin 13 provides for secure engagement of the mating threads of nut 24 and shaft 15 providing for complete lock up of the panels. Nut 24 may be impinged or deformed on the exterior, as at deformation 36 (or more spaced locations thereon), to provide deformation of the interior thread and secure non-removable lock up of nut 24 to shaft 15.

Figure 9:
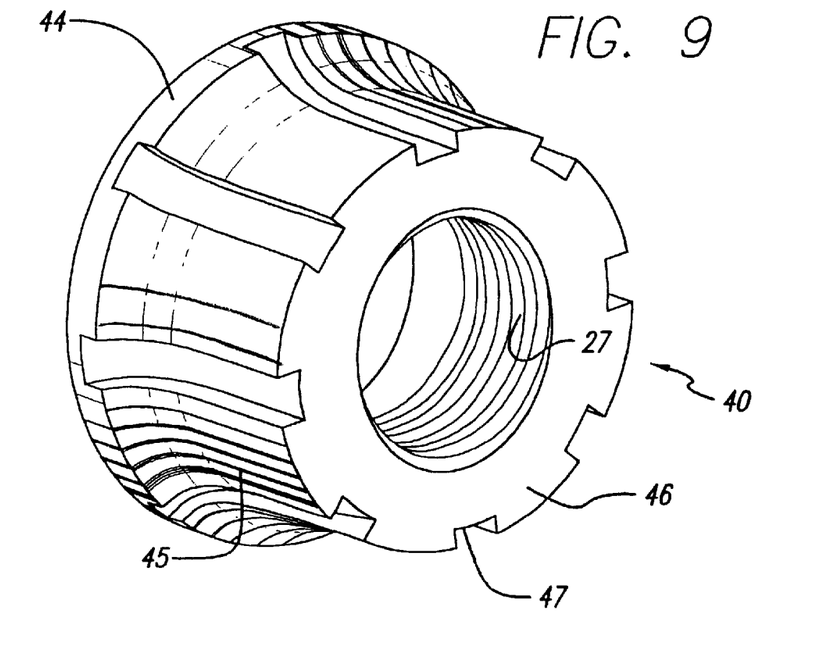
FIGS. 9 to 12 are perspective views of modifications of the nut of FIG. 7.

Although a particular nut 24 has been disclosed, a large variety of nuts can be used. These nuts are identical to nut 24 in the threaded area and illustrated as nuts 40 through 43 in FIGS. 9 through 12, respectively. In each case, identical reference numerals refer to like parts of the nut 24 of FIG. 1. Thus, looking at FIG. 9, nut 40 has a generally circular end portion 44, similar to portion 30 of nut 24, a tapered main body portion 45, and a generally circular smaller diameter end portion 46. A plurality of spaced elongated slots 47 interconnect portion 44, 46. These slots 47 act similarly to protrusions 29 of nut 24 to provide gripping surfaces for a suitable installation tool (not shown).

Figure 10:
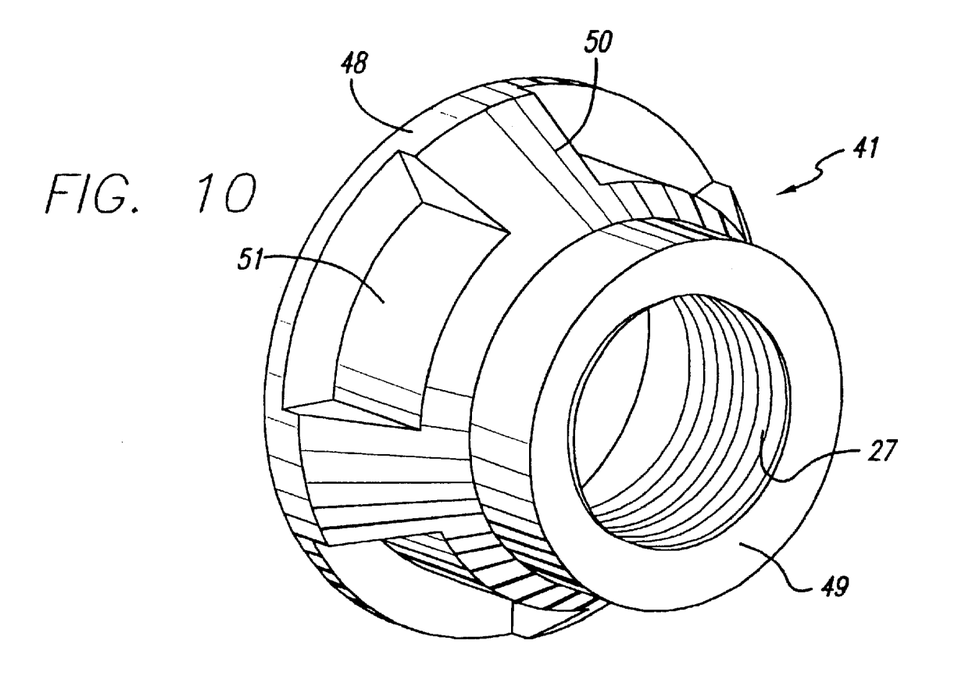

Nut 41 in FIG. 10 has a generally circular base portion 48 and a smaller diameter end portion 49. End portion 49 leads to a tapered main body portion 50 having a plurality of generally rectangular cutout areas 51 spaced thereabout. These areas (51) provide a gripping surface for a suitable installation tool (not shown).

Figure 11:
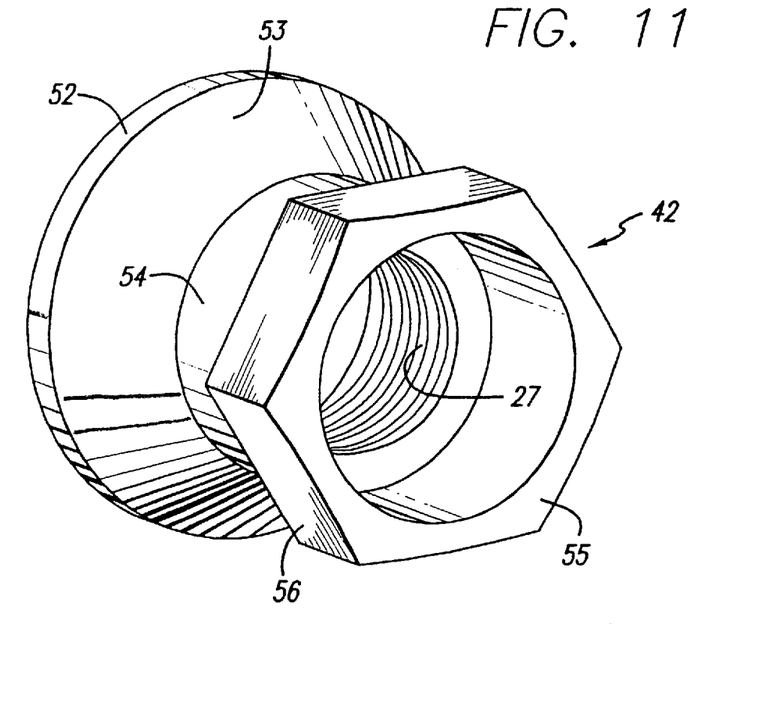

Nut 42 in FIG. 11 has a circular end portion 52 integral with a tapered portion 53 leading to an integral cylindrical portion 54 of lesser diameter. Cylindrical portion 54 is integral with a hexagonally shaped nut portion 55 providing a plurality of flats 56 suitable for gripping by an appropriate installation tool (not shown). If desired, nut portion 55 may include a break-off section to separate from the remainder of the nut after installation as is well known in the prior art.

Figure 12:
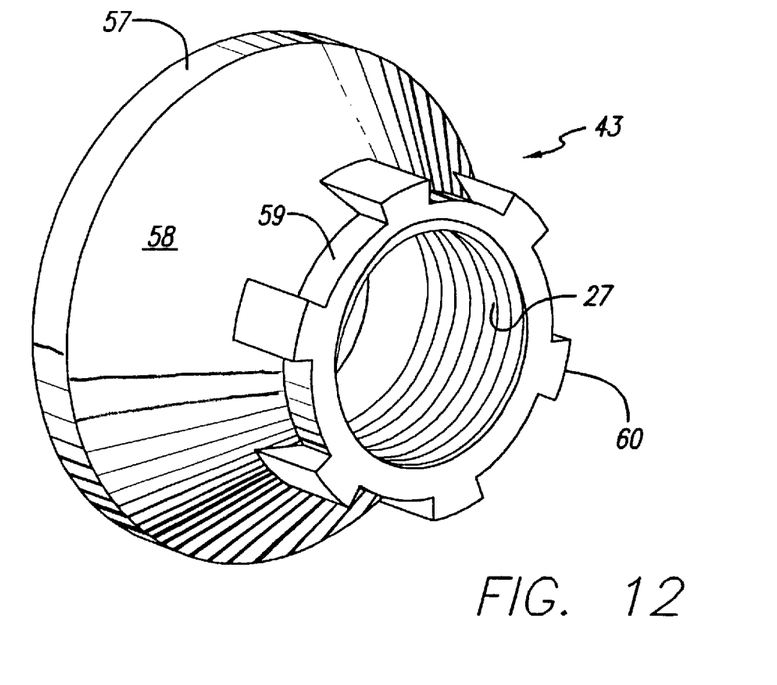

Finally, nut 43 in FIG. 12 has a circular base portion 57 and an integral tapered main body portion 58 leading to an integral generally cylindrical portion 59 of lesser diameter. A plurality of integral spaced protrusions 60 extend outwardly away from cylindrical portion 59 for gripping by a suitable installation tool (not shown).

Obviously many variations of nuts and gripping surfaces may occur to an artisan.

There is thus disclosed a method of modifying the thread of a pin and nut to change the pitch diameter, thread height, thread profile and root radius at the minor diameter of the threads thereby reducing the weight of the nut and pin while retaining the strength thereof. For example, a conventional ¼" diameter pin can be modified as disclosed herein saving considerable weight in many applications, particularly on aircrafts that use a tremendous amount of nut and pin combinations. There is no compromise of the fatigue or tension requirements of the pin and nut.

The nut is of lightweight material and the configuration where engaged by an installation tool further results in weight savings over the nut or nuts in U.S. Pat. No. 5,702,214.

Any suitable material can be used, such as stainless steel. The invention herein may be applied to any particular threaded diameter pin as long as the H to h ratio is maintained. This ratio is about 55% to 65%.

Increasing the minor diameter of the thread portions along with the root radius, as disclosed, allows the fastener to meet the fatigue and tension requirements of industry standards.

Figure 13:
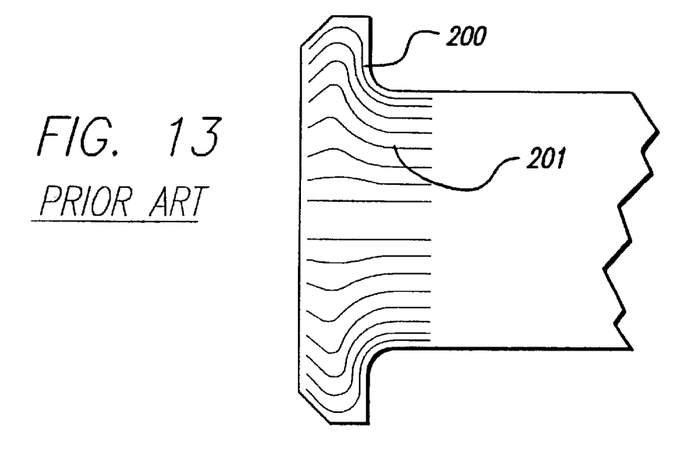
FIG. 13 is an elevation view of a portion of a prior art pin head.
Figure 14:
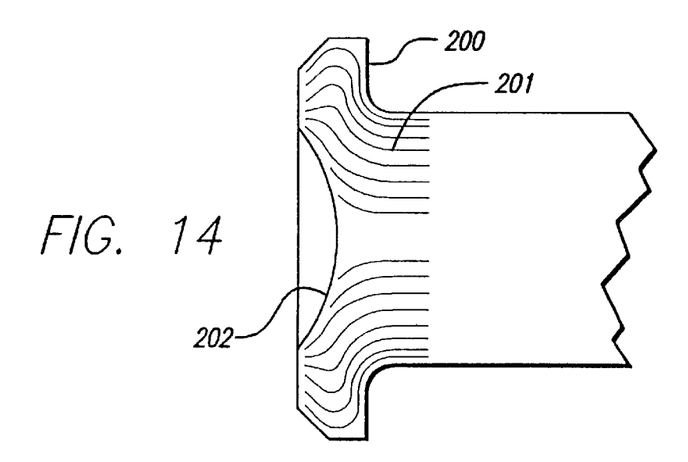
FIG. 14 is a view similar to FIG. 13 showing a cut-out portion in the head of FIG. 13.

Further, depending on the application, further weight can be reduced. For example, an application may call for a protruding-type pin head. As seen in the prior art pin in FIG. 13, lines 201 indicate cold working of the head. As seen in FIG. 14, a semi-circular cavity 202 of material may be carved out of head 200 to further reduce weight.

Figure 15:
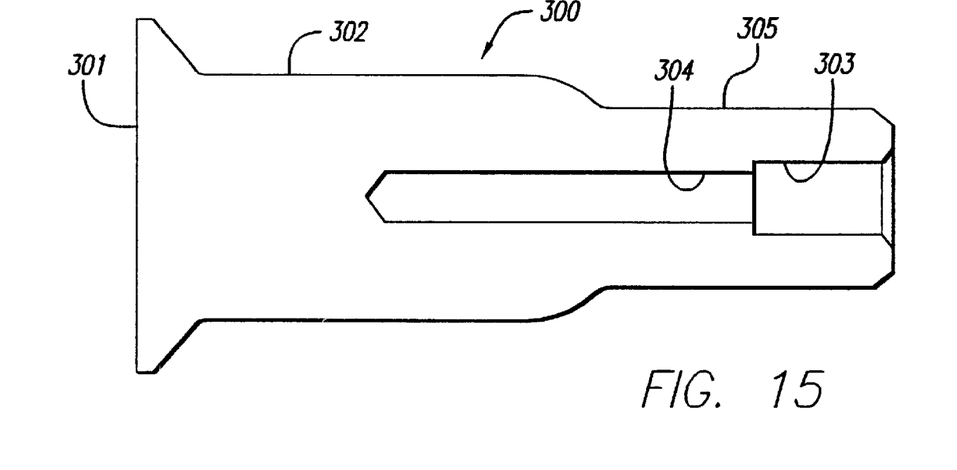
FIG. 15 is a vertical view of a further modification of the pin of FIG. 1.

As seen in FIG. 15, the pin 300, similar to pin 13 of FIG. 1 prior to formation of the same, may have a head 301, a cylindrical shank portion 302, an end section 305, which is subsequently threaded, and an internal drive socket 303 (similar to socket 18 in FIG. 1). A further elongated cavity 304 may extend along the interior of pin 300 in axial alignment with socket 303 to further reduce weight.

It can be seen that there is disclosed a fastener assembly including a pin having a head section, a cylindrical shank, a transition section, and a nut having a drive socket, all axially aligned. The head section may be provided in various configurations, such as tapered, protruding, etc. as is well known in the prior art, so as to accommodate the application in which the fastener is to be installed. The shank is sized to have the required axial, shear, and fatigue strength for the application and the transition section is formed to allow ease of installation and load transition from the shank to the threaded portion of the pin. The latter is equal in strength to the pin's head section and the drive socket provides means for driving the threaded portion of the nut onto the threaded portion of the pin.

The nut may have an outer configuration to assist driving the same onto the mating thread of the pin along with self-locking features. The pin head may have substantially the same strength as the threaded shaft and may be protruding, countersunk, or any other suitable type known in the prior art. The pin shank may have adequate strength to carry out the required shear load for the particular application. Although a helical thread is disclosed, a series of annular spaced threads or ridges separated by grooves lying in a plane perpendicular to the longitudinal axis of the pin shaft may be used. The pin may have an internal drive socket to further reduce weight and to assist in holding the pin in place when the drive nut is fastened to the pin.

There is thus disclosed a pin having a reduced thread diameter which offers weight savings. The modified thread allows the pin to meet established industry standards. The thread has a reduced thread height to improve the shear flow of the load through the thread. The thread has an enlarged root radius to decrease the stress concentration and increase the shear flow area and thus improve the fatigue performance of the fastener. The cold working of the pin increases grain flow throughout the pin improving its structural strength and fatigue performance.

The pin's transition section offers self-alignment capabilities as the fastener is inserted into generally aligned holes in aircraft structures. The rounded portion 104 would abut against the second panel opening after the threaded portion passes therethrough moving the second panel into hole alignment with the first. The pin shank may be tapered to improve alignment. Rolling of the thread improves the fatigue capabilities of the pin.

The term "thread" includes a helical thread having spaced thread portions or a plurality of spaced annular thread portions or ridges, each separate from the other and separated by grooves. Any suitable dimensions may be used as long as the factors and ratios set forth in FIG. 5 are maintained. For example, a pin having a cylindrical shank portion of 0.250 inches may be used, the invention set forth herein resulting in a thread diameter of 0.216 inches. The thread is thus modified to provide a pin meeting industry strength standards.

The invention herein greatly reduces the weight of the fastener assembly without comprising the strength required for the particular application.

Although a particular embodiment of the invention is disclosed, variations thereof may occur to an artisan and the scope of the invention should only be limited by the scope of the appended claims.

We claim:

1. In a method for forming a threaded pin and nut combination for use in permanently securing together a pair of mating panels having aligned apertures wherein said pin extends through said aligned apertures for threaded engagement by a like configured thread of a threaded nut without compromising the fatigue or tension requirements of the pin comprising the steps of:

forming the threads of said threaded pin by forming spaced threaded portions, each of which having a pair of flanks at an approximate angle of 60° each, truncating each said pair of flank defining an outer major diameter $D_1$, the imaginary point where said flanks would meet when extended to an apex being defined at a point D, forming opposing flank of adjacent spaced threaded portions to define a root diameter $d_1$, the imaginary point where said opposing flanks of adjacent spaced threaded portions would meet being defined at a point d, the distance between D and d being defined by H and the distance between $D_1$ and $d_1$ being defined by h, forming said distance h at about 55% to 65% of the distance H, and forming said root diameter as a continuous diameter, having a constant radius.

2. The method of claim 1 including configuring the outer periphery of said nut irregularly for engagement by a like configured installation tool.

3. The method of claim 1 wherein the step of forming spaced threaded portions includes the step of adding material between adjacent flanks at the intersection thereof.

4. The method of claim 3 wherein the step of adding material includes the step of adding a metallic material.

* * * * *